United States Patent
Boyer et al.

(10) Patent No.: US 10,049,044 B2
(45) Date of Patent: Aug. 14, 2018

(54) ASYNCHRONOUS CACHE FLUSHING

(71) Applicant: Advanced Micro Devices, Inc., Sunnyvale, CA (US)

(72) Inventors: Michael Boyer, Bellevue, WA (US);
Gabriel Loh, Bellevue, WA (US);
Nuwan Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 108 days.

(21) Appl. No.: 15/181,415

(22) Filed: Jun. 14, 2016

(65) Prior Publication Data

US 2017/0357583 A1 Dec. 14, 2017

(51) Int. Cl.
*G06F 12/0804* (2016.01)
*G06F 12/0806* (2016.01)
*G06F 12/0842* (2016.01)

(52) U.S. Cl.
CPC ...... *G06F 12/0804* (2013.01); *G06F 12/0806* (2013.01); *G06F 12/0842* (2013.01); *G06F 2212/1016* (2013.01); *G06F 2212/69* (2013.01)

(58) Field of Classification Search
CPC ...... G06F 3/061; G06F 3/0613; G06F 3/0659;
G06F 3/0689; G06F 3/0611; G06F
3/0629; G06F 3/0653; G06F 3/0655;
G06F 12/0238; G06F 12/0246; G06F
12/08; G06F 12/0802; G06F 12/0891;
G06F 2212/60; G06F 3/06; G06F 3/0656;
G06F 3/00; G06F 12/0804; G06F
12/0806; G06F 12/0842; G06F
2212/1016; G06F 2212/69
See application file for complete search history.

(56) References Cited

U.S. PATENT DOCUMENTS

| | | | | |
|---|---|---|---|---|
| 5,966,734 A * | 10/1999 | Mohamed | ........... | G06F 12/0897 711/128 |
| 9,436,603 B1* | 9/2016 | Pohlack | ................. | G06F 21/556 |
| 2007/0276631 A1* | 11/2007 | Subramanian | ........ | G06F 11/008 702/186 |
| 2010/0235670 A1* | 9/2010 | Keller | .................... | G06F 1/3203 713/324 |
| 2012/0331234 A1* | 12/2012 | Hirao | .................... | G06F 12/084 711/135 |
| 2014/0258637 A1* | 9/2014 | Hong | .................. | G06F 12/0808 711/135 |

* cited by examiner

Primary Examiner — Hashem Farrokh
(74) Attorney, Agent, or Firm — Liang & Cheng, PC (57) ABSTRACT

Proactive flush logic in a computing system is configured to perform a proactive flush operation to flush data from a first memory in a first computing device to a second memory in response to execution of a non-blocking flush instruction. Reactive flush logic in the computing system is configured to, in response to a memory request issued prior to completion of the proactive flush operation, interrupt the proactive flush operation and perform a reactive flush operation to flush requested data from the first memory to the second memory.

20 Claims, 4 Drawing Sheets

ASYNCHRONOUS CACHE FLUSHING

GOVERNMENT RIGHTS

This invention was made with Government support under Prime Contract Number DE-AC52-07NA27344, Subcontract Number B600716 awarded by DOE. The Government has certain rights in this invention.

TECHNICAL FIELD

This disclosure relates to the field of memory and, in particular, to cache flushing in a computing system.

BACKGROUND

Processors in modern computing systems typically utilize a relatively small and fast cache memory for quick access to frequently used data during execution of a program. By temporarily storing frequently accessed data in faster memory, the processor can speed execution by avoiding the use of higher latency main memory. Due to its size, cache memory can be located on the same physical die as the processing core.

When the data no longer needs to remain in the cache, the data can be written back to the main memory if it has been modified while in the cache, and flushed from the cache. Flushing involves invalidating the cached data, effectively deleting the entries in the cache. This process may be initiated by a "write-back and invalidate" instruction such as WBINVD.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In the absence of a hardware cache coherence mechanism, cache flushing during execution of a program in a processor can be used to ensure that data from a particular region of memory is not contained in a particular cache at a specific point during the program's execution. According to one implementation, the processing core waits until flushing of the cache has completed before continuing execution of any further instructions in order to avoid inconsistencies between the cache and main memory.

In one embodiment, performance of the processor can be further optimized through the implementation of a non-blocking cache flush instruction that does not prevent the processing core from continuing execution of instructions during the cache flushing operation. The system may also rely on an underlying hardware coherence mechanism to ensure consistency of the data. By this mechanism, a significant fraction of the flushing operation can be moved off the critical path of the program and the processing core can be made available for other work.

In one embodiment, the non-blocking cache flush can be implemented in a heterogeneous system where different phases of a computation map more efficiently to different types of processors in the system, thereby requiring computation (and data) to be frequently migrated to the different processors in the system. In such a heterogeneous system, a cache flush that is performed as part of the migration process does not inhibit the flushing processor from continuing execution of other instructions from the same or a different program before the flush has completed.

In one embodiment, a non-blocking cache flush can be implemented in a computing system where one processor is closer to memory than to another; in such a case, the near-memory processor can achieve higher performance (and lower energy consumption) if its requests can proceed directly to memory, rather than requiring long-latency and low-bandwidth communication with another more distant processor. For example, a stacked memory system may have at least one processor in memory (PIM) within the stack, and may also have a processor outside the memory stack. In this case, the amount of off-stack communication in the application's critical path (e.g., accessing data from an off-stack cache) can be reduced by a non-blocking cache flush that is initiated as part of the process of migrating computation onto the PIM. The same effect could be achieved in a non-PIM non-uniform memory access (NUMA) system for a processor that can access its local memory more quickly than it can access a remote cache.

Figure 1:
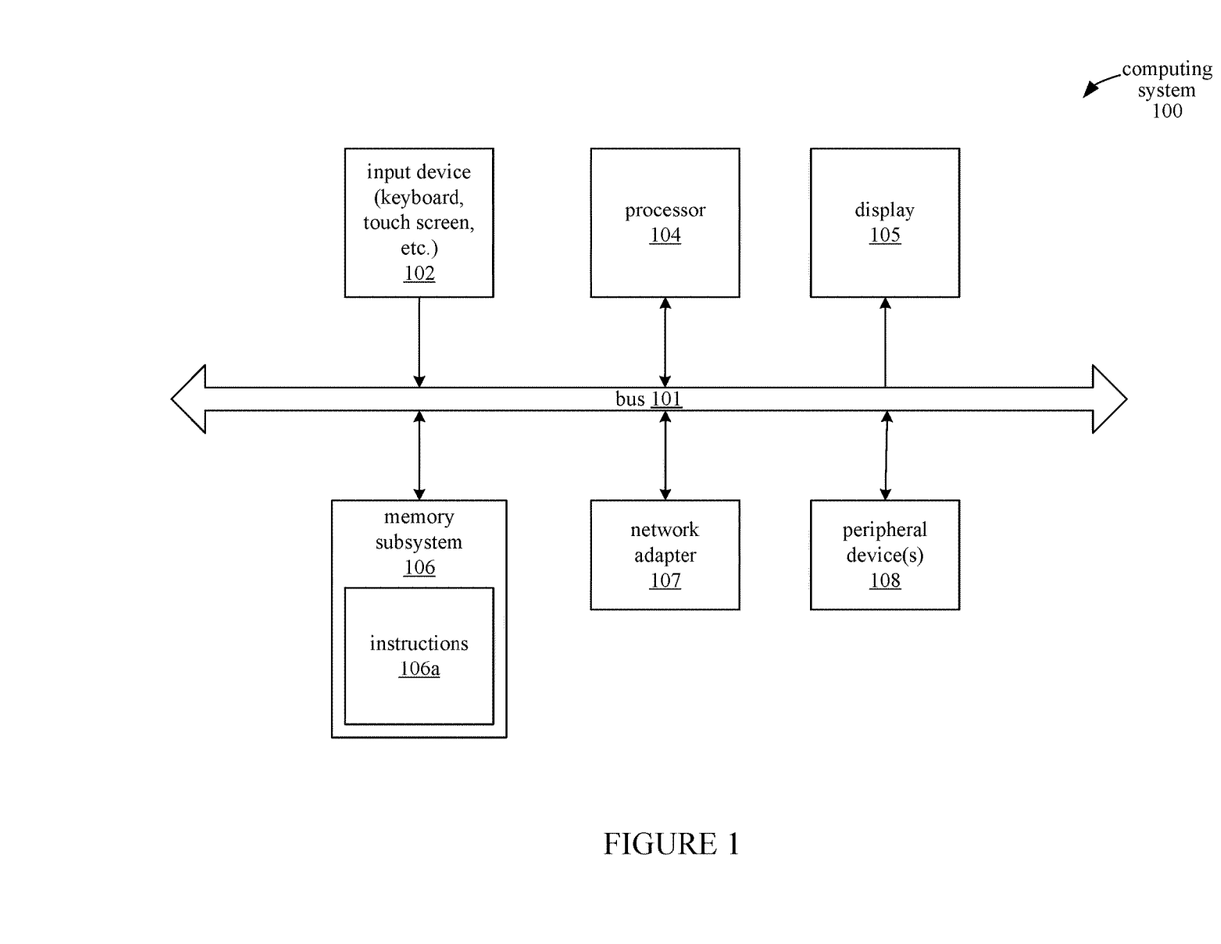
FIG. 1 illustrates an embodiment of a computing system.

FIG. 1 illustrates an embodiment of a computing system 100 which may implement a non-blocking cache flush operation as described above. In general, the computing system 100 may be embodied as any of a number of different types of devices, including but not limited to a laptop or desktop computer, mobile phone, server, etc. The computing system 100 includes a number of components 102-108 that can communicate with each other through a bus 101 or other form of interconnect. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 may be embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices that can be used by the computing system 100.

Computing system 100 includes a processor 104 that is configured to receive and execute instructions 106a that are stored in the memory subsystem 106. In alternative embodiments, the processor 104 can be any processing element, including but not limited to a central processing unit (CPU), a graphics processing unit (GPU), an accelerated processing unit (APU), a field programmable gate array (FPGA), a digital signal processor (DSP), or any other application-specific integrated circuit (ASIC).

Memory subsystem 106 includes memory devices used by the computing system 100, such as random-access memory (RAM) modules, read-only memory (ROM) modules, hard disks, and other non-transitory computer-readable media. The memory included in memory subsystem 106 is used as main memory in the computing system 100. Additional types of memory can be included in memory subsystem 106 or elsewhere in computing system 100. For example, cache memory and registers may also be present in the processor 104 or on other components of the computing system 100.

In one embodiment, the memory subsystem 106 also includes one or more processor in memory (PIM) stacks. Some or all of these PIM stacks may also include a processor or processing logic that can operate independently from or in conjunction with the host processor 104.

Figure 2:
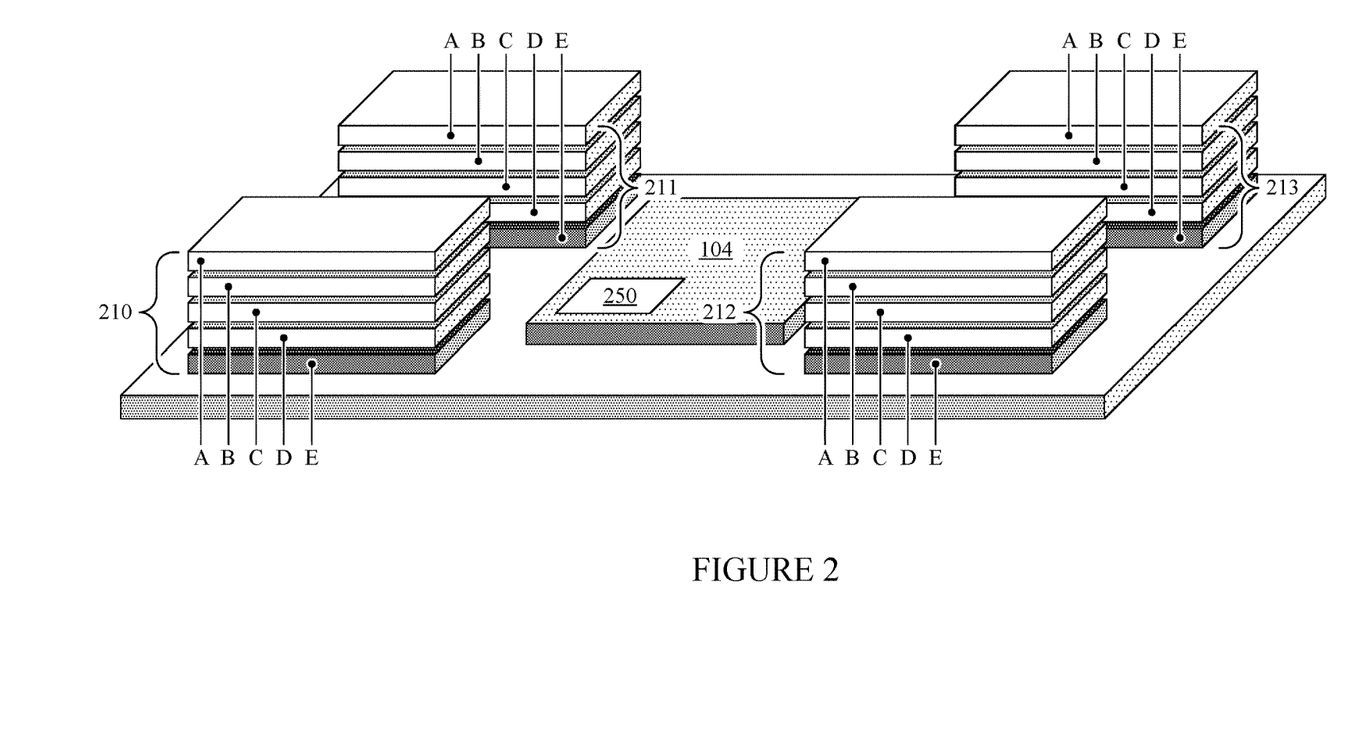
FIG. 2 illustrates an embodiment of a computing system including processor-in-memory (PIM) stacks.

FIG. 2 illustrates a portion of the computing system 100, including the host processor 104 with cache 250. As illustrated in FIG. 2, the host processor 104 is mounted on a substrate with PIM stacks 210, 211, 212, and 213. Each of the memory stacks 210-213 comprises stacked dies A, B, C, D, and E. As referenced herein, individual dies are identified by the reference characters of their respective memory stacks, followed by the letter A, B, C, D, or E identifying the position of the die within the stack. For example, dies 210E, 211E, 212E, and 213E are logic dies located at the bottoms of the memory stacks 210, 211, 212, and 213, respectively. The A, B, C, and D dies in each of the stacks 210-213 are memory dies. The memory provided in these dies operates as part of the memory subsystem 106.

The integration of processors or other computing logic in the logic dies 210E, 211E, 212E, and 213E within the memory stacks 210-213 enables PIM capabilities within each memory stack. In each of the stacks 210-213, the memory dies A-D are vertically stacked on top of the logic die E using three-dimensional (3D) die stacking technology and connected by through-silicon-vias (TSVs). This arrangement offers high bandwidth, low latency memory accesses from the processors or other logic implemented in the in-stack logic dies E. In alternative embodiments, the logic die may be positioned on top or in between the memory dies in the stack; for example, the logic die E may be positioned on top of the memory dies A-D instead of underneath the memory dies A-D. In alternative embodiments, techniques other than TSVs may be employed for connecting the stacked dies.

Figure 3:
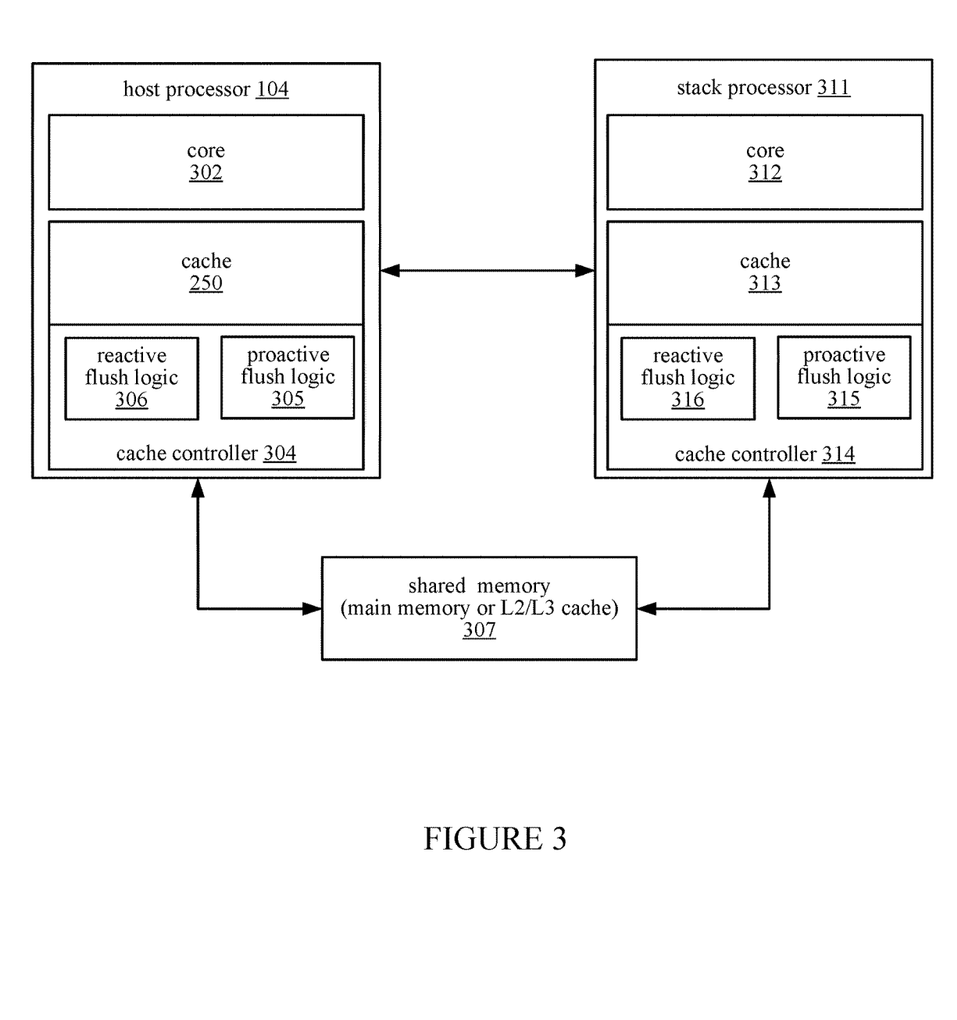
FIG. 3 illustrates computing devices in a computing system, according to an embodiment.

FIG. 3 is a block diagram illustrating components of computing system 100 involved in the execution of a non-blocking cache flush operation, which may be performed, for example, during the migration of a program within the system 100, according to an embodiment. FIG. 3 illustrates the computing core 302 for executing program instructions in the host processor 104. The computing core 302 is coupled with the cache memory 250, which stores data used by the computing core 302. The cache controller 304 includes proactive flush logic 305 and reactive flush logic 306 for performing flush operations on the cache 250.

FIG. 3 also illustrates a stack processor 311, which may be implemented on a logic die in a PIM stack, such as die 212E in PIM stack 212. Stack processor 311 includes a computing core 312 coupled to a cache 313, and a controller 314 for the cache 313. Shared memory 307 is memory that can be accessed by both of the host processor 104 and the stack processor 311. For example, the shared memory 307 may represent level 2 (L2) or level 3 (L3) cache, or main memory implemented in the PIM stack of the stack processor 311.

During migration of a program or a segment of a program from a first computing device (e.g., host processor 104) to a second computing device (e.g., the PIM stack including processor 311) or the invocation of a program or a segment of a program from a first computing device (e.g., host processor 104) on a second computing device (e.g., the PIM stack including processor 311), the system 100 ensures a consistent view of the program's memory by both computing devices using proactive and reactive flush operations performed by the proactive flush logic 305 and the reactive flush logic 306, respectively, to flush data from cache 250 to the shared memory 307, where it is accessible to both computing devices. Similarly, cache controller 314 may flush the cache 313 of the stack processor 311 using its own reactive flush logic 316 and proactive flush logic 315. The shared memory 307 may generally be any memory that can be accessed by either computing device, and can be located on a processor die, in the PIM stack, etc.

For a proactive flush operation, program data in cache 250 is flushed to an appropriate memory level (i.e., shared memory 307) so that the data can be accessed by the computing device to which the program is being migrated (i.e., stack processor 311). The proactive flush logic 305 initiates the proactive flush operation in response to a non-blocking flush instruction, which may be executed by the host processor as part of the process for migrating the program from the host processor 104 to the stack processor 311.

In one embodiment, a simple state machine in the proactive flush logic 305 is configured to, when triggered, iterate through all of the cache lines in some predetermined order (e.g., all of the ways in set 0 first, starting with way 0, then all of the ways in set 1, etc.), flushing each cache line in turn.

In one embodiment, the proactive flush operation copies the entire contents of the cache 250 to the shared memory 307. Alternatively, the proactive flush operation may copy all of the data in cache 250 that is associated with the program, or only the data that will be accessed by the stack processor 311 to the shared memory 307. Selectively flushing only the shared data (i.e., data that is designated to be shared with both processors) in the cache 250 reduces the overhead of the flushing operation and can also reduce the cache miss rate.

After the proactive flush has been completed, memory accesses from stack processor 311 generally will not require any data from cache 250 (assuming subsequent computations on host processor 104 do not load shared data into the cache 250); thus, more costly off-stack cache accesses can be avoided by the stack processor 311.

In the absence of a hardware coherence mechanism, the proactive flush operation is a blocking operation that prevents continued execution of the program by the stack processor 311 until the flush operation has been completed in order to ensure data consistency. Further, the migration of the computation to the stack processor 311 cannot occur until the completion of the proactive flush operation. However, the system 100 may implement a non-blocking proactive flush operation by also relying on a hardware coherence protocol, as provided by the reactive flush logic 306, to reactively copy data from the host processor 104 to the shared memory 307 in response to memory requests originating from the continued execution of the migrated program on the stack processor 311. The proactive flush operation by itself incurs the cost of the data migration up front. In contrast, the reactive flush by itself spreads the cost of the data migration over a longer time period, reducing the performance of any subsequent accesses from the stack processor 311 requesting data still in cache 250.

In one embodiment, the non-blocking cache flush instruction implements the proactive flush in conjunction with the reactive flush by allowing the application to specify a relative priority for the proactive flushing operation and for subsequent memory operations (which may trigger a reactive flush operation) issued by the same core. Thus, a non-blocking flush operation may be given any of a range of priority levels to allow the non-blocking flush operation to be interrupted so that higher priority memory requests can be serviced. In contrast, a blocking flush can be achieved by prioritizing the flushing operation over any other memory operations so that the other memory operations are not serviced until the blocking flush is completed. Accordingly, the blocking and non-blocking flush may be implemented using similar mechanisms; for example, both types of flush operations may be implemented using a dedicated hardware structure, or both may be implemented as a microcoded software loop.

In one embodiment of system implementing a priority-based non-blocking flush, a memory request for cached data that is in the process of being proactively flushed can cause the proactive flush operation to be interrupted. For example, a memory request for data that has not yet been flushed could be issued by the stack processor 311 and received by the reactive flush logic 306, which then compares the priority level of the memory request with the priority level of the proactive flush operation. If the memory request has a higher priority, the reactive flush logic 306 interrupts the proactive flush operation being executed by the proactive flush logic 305 in order to reactively flush the data requested in the memory request.

The reactive flush logic 306 performs the reactive flush operation to flush the requested data, which is identified in the memory request, from the cache 250 to the shared memory 307. After the reactive flush operation has completed, the requested data is accessible to the stack processor 311. The proactive flush logic 305 then resumes execution of the proactive flush operation in order to continue copying the remaining data from cache 250 to the shared memory 307, except for any data already copied by the reactive flush.

The combination of the proactive and reactive approaches avoids the major drawbacks of both approaches by allowing program execution to continue while the proactive flush proceeds. This approach minimizes the upfront cost of data migration while also reducing the number of subsequent accesses of data that has not yet been flushed. In situations where the reactive flush is not triggered by any requests for data prior to flushing of the data, the non-blocking flush may perform similarly to a comparable blocking flush (e.g., a write back and invalidate operation) but without blocking program execution.

The non-blocking flush provides for flushing of data from the cache 250 to a shared memory 307 in an asynchronous manner, which allows the migrated program to continue execution on the destination processor (e.g., stack processor 311) before the non-blocking flush has finished copying all of the data. Accordingly, the destination processor may generate one or more memory requests caused by the execution of the migrated program prior to the completion of the non-blocking flush, thus triggering a reactive flush operation if the requested data has not yet been flushed.

The non-blocking flush also allows the original processor (e.g., host processor 104) that called the non-blocking flush instruction to continue executing instructions (from the same program or a different program) while the flush is in process. In this case, data existing in the cache at the time the flush operation begins (and therefore data that the program expects to be flushed) may be read back into the cache after it is flushed but before the entire flush has completed. However, this behavior is not a concern since the underlying hardware coherence mechanism will still guarantee correct execution.

In one embodiment, a computing system uses the asynchronous non-blocking flush to reduce the energy consumption and performance overhead costs of hardware cache coherence. Such a system may operate in such a way that proactive cache flushing is used as the primary means for ensuring coherence, and the reactive (hardware) coherence is only used to ensure correctness during the actual flush operation. Therefore, depending on the specific hardware coherence mechanism used, some or all of the hardware coherence messages can be disabled on all processors except when a flush operation is in progress on one or more of the processors within the coherence domain.

Figure 4:
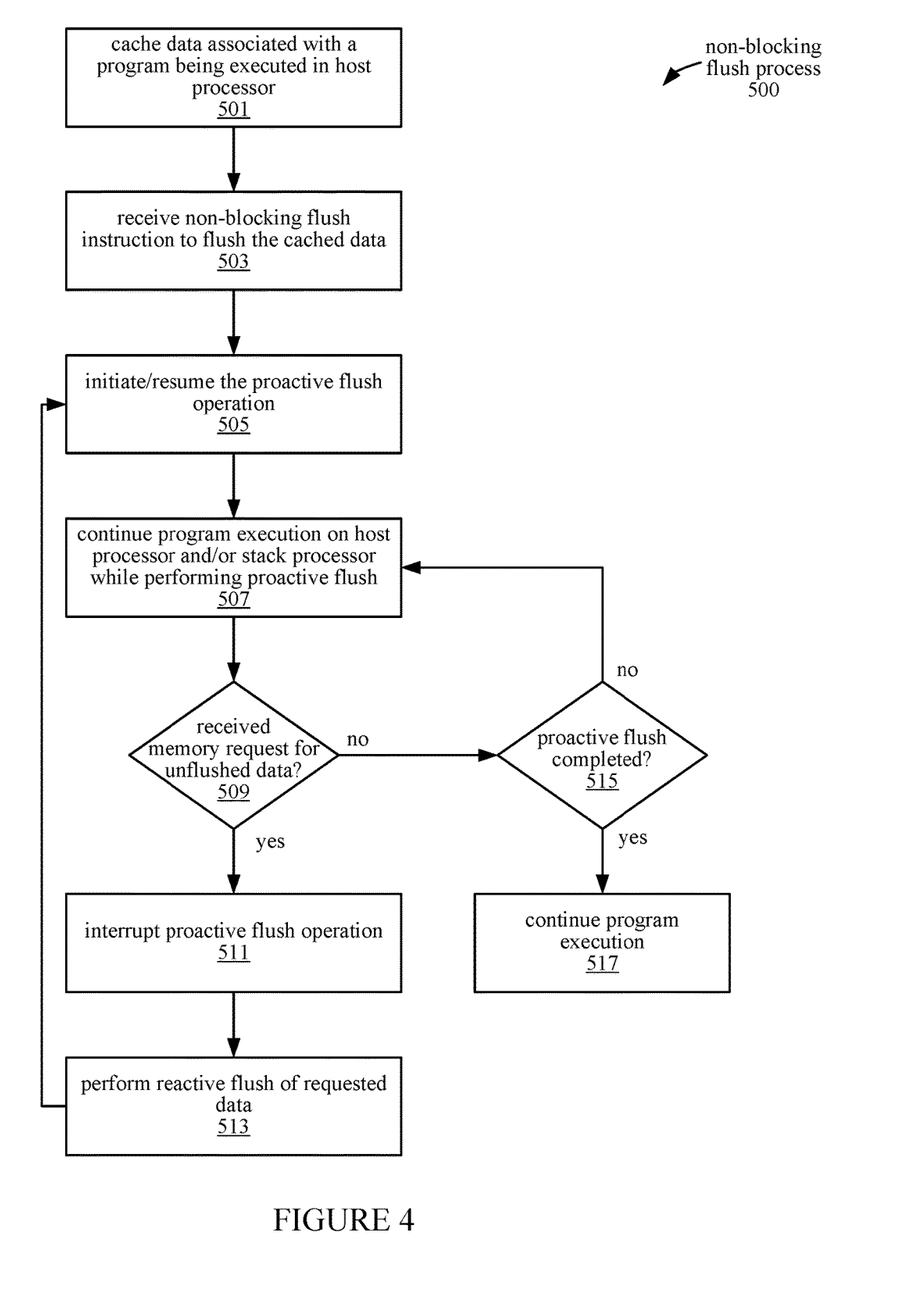
FIG. 4 is a flow diagram illustrating a process of performing a non-blocking flush operation, according to an embodiment.

FIG. 4 illustrates a block diagram of a process 500 for performing a non-blocking cache flush, according to an embodiment. In one embodiment, the non-blocking flush process 500 is performed by the cache controller 304 and other components of the host processor 104, stack processor 311, and shared memory 307. In alternative embodiments, some or all of the operations of process 500 can be performed by other components in the computing system 100.

The process 500 begins at block 501. At block 501, the cache 250 is used to store data that is associated with a program being executed by a host processor 104. For example, the cache 250 may store variables or other data that is frequently accessed by the processing core 302 that is executing the program instructions. From block 501, the process 500 continues at block 503.

At block 503, the processor 104 receives and executes a non-blocking cache flush instruction. For example, the non-blocking cache flush instruction may be issued as part of a process for migrating the program to a different computing device, such as a PIM stack including stack processor 311. From block 503, the process 500 continues at block 505.

At block 505, the proactive flush logic 305 responds to the non-blocking cache flush instruction by initiating a proactive flush operation to flush data from the cache 250 to a shared memory 307. If the non-blocking cache flush is performed during migration of the program, flushing the cached data to the shared memory 307 makes the data accessible to the destination computing device (i.e., the PIM stack including processor 311). For example, the shared memory 307 may represent memory in the PIM stack, or a different level (e.g., L2 or L3) of cache memory that can also be accessed by the stack processor 311. The proactive flush operation copies some or all of the data stored in the cache 250 to the shared memory 307; for example, the proactive flush may copy some or all of the data associated with the program being executed. The proactive flush operation may proceed by iteratively flushing each of the cache lines of the cache 250 according to a predetermined order. In embodiments where the cache 250 contains copies of data in the shared memory 307, flushing may only copy cache lines that have been modified in the cache 250 with respect to the shared memory 307. In such cases, any unchanged cache lines in the cache 250 may be invalidated as part of the proactive flush operation without being copied to the shared memory 307.

At block 507, the program execution continues on the host processor 104, or may continue on the stack processor 311 if the program is being migrated to the stack processor 311. Since the flush operation is non-blocking, the program execution may continue even prior to completion of the proactive flush operation. In one embodiment, the host processor 104 may continue executing a second program different from the original program prior to completion of the proactive flush operation. From block 507, the process 500 continues at block 509.

At block 509, if the cache controller 304 determines (e.g., via a hardware cache coherence scheme) whether a memory request has been issued by the destination computing device (i.e., the PIM stack including processor 311) that requests data that is included in the proactive flush and has not yet been flushed. If such a memory request has been issued, the process 500 continues at block 511. In a priority-based system, the cache controller 304 may also determine whether the memory request has a higher priority than the proactive flush operation, and continues to block 511 if the priority of the memory request is higher.

At block 511, the reactive flush logic 306 interrupts the proactive flush operation in order to perform a reactive flush operation at block 513. The reactive flush operation copies the data identified in the memory request from the cache 250 to the shared memory 307. After the reactive flush operation has completed, the process 500 continues back to block 505.

At block 505, the proactive flush logic 305 resumes the previously initiated proactive flush operation and continues copying the unflushed data from the cache 250 to the shared memory 307. Thus, through the repeated operation of blocks 505-513, the proactive flush operation can be temporarily interrupted zero or more times by a higher-priority memory request so that a reactive flush operation can flush the requested data before the requested data is flushed by the proactive flush operation.

If, at block 509, no memory request has been received, then the process 500 continues at block 515. At block 515, the cache controller 304 determines whether the proactive flush operation has completed. In one embodiment, the proactive flush operation is completed when all of the data included in the flush operation has been copied from the cache 250 to the shared memory 307. In embodiments where the cache 250 contains copies of data in shared memory 307, the proactive flush operation is completed when all of the modified data included in the flush operation has been copied from the cache 250 to the shared memory 307 and all of the unmodified data included in the flush operation has been invalidated in the cache 250.

At block 515, if the proactive flush operation has not completed, the process 500 continues back to block 507 to continue the proactive flush. If the proactive flush operation has completed, the process 500 continues from block 515 to block 517. At block 517, the host processor 104 and/or the stack processor 311 continues executing instructions for the original program or a different program after completion of the non-blocking flush. In the case where the original program is being migrated from the host processor 104 to the stack processor 311, the stack processor 311 may continue executing the migrated program using the data now flushed to the shared memory.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware comprising the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. An apparatus, comprising:
   a processor core configured to execute a non-blocking flush instruction in response to migration of a program from a first computing device to a second computing device;
   proactive flush logic configured to perform a proactive flush operation to flush data from a first memory in the first computing device to a second memory external to the first computing device in response to the execution of the non-blocking flush instruction; and
   reactive flush logic coupled with the first memory and the second memory and configured to, in response to a memory request issued prior to completion of the proactive flush operation:
   interrupt the proactive flush operation, and
   perform a reactive flush operation to flush requested data identified by the memory request from the first memory to the second memory.

2. The apparatus of claim 1, wherein the second memory is a shared memory accessible to the second computing device.

3. The apparatus of claim 1, wherein the second computing device is configured to resume execution of the migrated program prior to completion of the proactive flush operation.

4. The apparatus of claim 3, wherein:
   the second computing device is configured to generate the memory request in response to the execution of the migrated program, and
   the reactive flush logic is configured to interrupt the proactive flush operation in response to determining that the requested data have not been flushed from the first memory and the memory request has a higher priority level than the proactive flush operation.

5. The apparatus of claim 1, wherein the proactive flush logic is further configured to resume the proactive flush operation in response to completion of the reactive flush operation.

6. The apparatus of claim 1, wherein the data in the first memory to be flushed by the proactive flush operation comprises all data that is associated with a program being executed by the first computing device.

7. The apparatus of claim 1, wherein the first computing device is configured to begin execution of a program prior to completion of the proactive flush operation.

8. The apparatus of claim 1, wherein:
   the first memory comprises a cache memory of a host processor, and
   the second memory comprises a main memory of a computing system comprising the first computing device.

9. The apparatus of claim 8, wherein:
   the proactive flush logic and reactive flush logic are implemented in a cache controller of the host processor, and
   the proactive flush logic comprises a state machine configured to iteratively flush each of a plurality of cache lines of the cache memory according to a predetermined order.

10. A method, comprising:
    executing a non-blocking flush instruction response to migration of a program from a first computing device to a second computing device;
    performing a proactive flush operation to flush data from a first memory in the first computing device to a second memory external to the first computing device in response to the execution of the non-blocking flush instruction; and
    in response to a memory request issued before completion of the proactive flush operation:
    interrupting the proactive flush operation, and
    performing a reactive flush operation to flush requested data identified by the memory request from the first memory to the second memory.

11. The method of claim 10, further comprising:
    migrating the program from the first computing device to the second computing device;
    resuming execution of the migrated program in the second computing device prior to completion of the proactive flush operation; and
    generating the memory request in response to the execution of the migrated program.

12. The method of claim 10, further comprising resuming the proactive flush operation after completion of the reactive flush operation.

13. The method of claim 10, further comprising beginning execution of a program in the first computing device prior to completion of the proactive flush operation.

14. The method of claim 10, wherein:
    the first memory is a cache memory of a host processor, and
    the second memory is a main memory of a computing device comprising the first computing device.

15. The method of claim 14, wherein performing the proactive flush operation further comprises iteratively flushing each of a plurality of cache lines of the cache memory according to a predetermined order.

16. The method of claim 10, wherein the interrupting the proactive flush operation is performed in response to determining that a priority level of the memory request exceeds a priority level of the proactive flush operation.

17. A computing system, comprising:
    a first computing device including a first memory and configured to execute a program;
    a second memory coupled with the first computing device;
    proactive flush logic configured to perform a proactive flush operation to flush data from the first memory to the second memory in response to execution of a non-blocking flush instruction, wherein the non-blocking flush instruction is executed in response to migration of the program from the first computing device to a second computing device; and
    reactive flush logic coupled with the first memory and the second memory and configured to, in response to a memory request issued prior to completion of the proactive flush operation:
    interrupt the proactive flush operation, and
    perform a reactive flush operation to flush requested data identified by the memory request from the first memory to the second memory.

18. The computing system of claim 17, further comprising a processor-in-memory (PIM) stack, wherein the second memory comprises stacked memory dies in the PIM stack, and wherein the first computing device further comprises a host processor coupled with the first memory and configured to execute the non-blocking flush instruction.

19. The computing system of claim 18, wherein the proactive flush logic is implemented in a cache controller of the host processor and is further configured to perform the proactive flush operation by iteratively flushing each of a plurality of cache lines of the first memory according to a predetermined order.

20. The computing system of claim 17, wherein:
the second memory is a shared memory accessible to the second computing device, and
the second computing device is configured to:
resume execution of the migrated program prior to completion of the proactive flush operation, and
generate the memory request in response to the execution of the migrated program.

* * * * *